United States Patent [19]

Pepchinski

[11] Patent Number: 4,837,752

[45] Date of Patent: Jun. 6, 1989

[54] METHOD FOR ESTABLISHING A COMMON BANDWIDTH FOR PROCESSING SEISMIC DATA OBTAINED FROM DIFFERENT SOURCES, RECORDING EQUIPMENT AND SURVEYS

[75] Inventor: Michael P. Pepchinski, Houston, Tex.

[73] Assignee: Exxon Production Research Co., Houston, Tex.

[21] Appl. No.: 243,454

[22] Filed: Sep. 12, 1988

[51] Int. Cl.⁴ .............................................. G01V 1/30
[52] U.S. Cl. ...................................... 367/38; 367/21; 367/43; 367/63; 364/421
[58] Field of Search ...................... 367/21, 38, 43, 46, 367/47, 48, 49, 63, 74; 181/111; 364/421

[56] References Cited

U.S. PATENT DOCUMENTS 3,351,899 11/1967 Luehrmann et al. .................. 367/23
3,460,064 8/1969 Giles et al. ............................. 367/23
4,500,978 2/1985 Ziolkowski et al. ................. 367/142

OTHER PUBLICATIONS

"Principles of Least-Squares Filtering", Robinson, E. A. and Treitel, S., 1980, Geophysical Signal Analysis: Englewood Cliffs, N.J. Prentice-Hall.
"A Combined Dynamite-Vibroseis 3-D Survey in the Subalpine Overthrust Zone of Austria", Schimunek and Storbl, Ernst, Jul. 1985, First Break, vol. 3, No. 7.
"Mixed Source Technique in Land Acquisition", Hall, M. A., Jan. 20, 1986, Horizon Exploration Limited, Horizon House, Azalea Drive, Swanley, Kent BR8 8JR, England.

Primary Examiner—Thomas H. Tarcza
Assistant Examiner—Ian J. Lobo
Attorney, Agent, or Firm—Vaden, Eickenroht, Thompson & Boulware

[57] ABSTRACT

A common bandwidth determination method for two disparate seismic datasets includes developing a weighted average of first least-squares filters assuming the data from the first dataset is the input and the data from the second dataset is the desired output, developing a weighted average of second least-squares filters assuming the data from the second dataset is the input and the data from the first dataset is the desired output, determining a first transfer function from the first weighted average filter design and a second transfer function from the second weighted average filter design, plotting respective amplitude and phase spectra using each of the first and second transfer functions, plotting the product of the amplitude spectra and the sum of the phase spectra and determining the common bandwidth where the amplitude spectra is one and the phase spectra is zero.

7 Claims, 5 Drawing Sheets

METHOD FOR ESTABLISHING A COMMON BANDWIDTH FOR PROCESSING SEISMIC DATA OBTAINED FROM DIFFERENT SOURCES, RECORDING EQUIPMENT AND SURVEYS

BACKGROUND OF THE INVENTION

This invention pertains to matching disparate seismic data and more specifically to a procedure for establishing a common bandwidth for processing two seismic datasets developed using different sources, different recording equipment and/or different surveys.

DESCRIPTION OF THE PRIOR ART

Recently, many seismic surveys are being conducted in areas known as transition zones where, as a consequence of changes in terrain, it is necessary to use a combination of different types of energy sources and receivers in order to extend the coverage of the survey. For example, as a seismic survey moves from land to marine it may be necessary to use dynamite and geophones for the land part while it may be necessary to use air guns and hydrophones for the marine part. As a result, the frequency and phase content of the data will vary from the dynamite-geophone part of the survey to the air gun-hydrophone part. This causes a mismatch in the data from both parts of the survey. Therefore, in order for a valid interpretation to be made, it is necessary to determine a common frequency range over which data from both parts can be matched.

A similar problem is encountered in seismic line tie situations where data from seismic surveys of different vintages must be matched so that contour maps of a given prospect can be drawn. For example, a given prospect may have been surveyed once using dynamite energy sources which resulted in the data having a narrow frequency bandwidth. Later it may have been surveyed using seismic vibrators, which yielded data with a wider frequency bandwidth. In this case it is necessary to determine the common frequency range over which data from, say, the dynamite survey can be made to look like data from the vibrator survey. Once the dynamite data has been matched to the vibrator data, the geologist has additional information to use in developing contour maps of the given prospect.

The main observation from these examples is that the use of different energy sources/receivers results in data that is mismatched in both its phase and frequency bandwidth, which makes it extremely desirable that such data be matched to a common bandwidth.

In July of 1985, a paper by Karl Schimunek and Ernst Strobl appeared in the journal *First Break*, which described a procedure including a data matching procedure that has some similarities as well as many differences with the invention described herein. The authors consider a two-source, 3-D seismic survey and focused on the design of a filter to match data recorded from one source (dynamite) with data recorded from a second source (vibrator). An estimate of the signal band was made from the amplitude and phase spectra of the resulting filter.

The procedure that they described consisted of the following steps:

First, they selected 26 surface locations to be surveyed with both sources. From these original 26 locations data was selected from six evenly spaced locations to produce two datasets, the first containing six dynamite-produced traces and the second containing the corresponding six vibrator-produced traces.

Second, for each pair of dynamite and vibrator traces, a filter was designed to match the dynamite trace with its corresponding vibrator trace, thereby producing six filters, one for each matched pair.

Third, they averaged the six filters.

Fourth, they computed the discrete Fourier Transform of the average obtained in step three, resulting in a transform function for matching the dynamite traces with the vibrator traces.

Fifth, from the Fourier Transform function of step four, they formed the amplitude and phase spectra.

Sixth, they plotted the amplitude and phase spectra as a function of frequency and determine the bandwidth of the signal by visual inspection of these plots.

The shortcomings of the Schimunek and Stroble procedure are numerous. First, the average of the filter design is not as good an approximation as can be had by developing a weighted average of the filters for the sets of traces selected for study. Second, there is no discrimination against error, for example, spurious noise, appearing in some of the traces. Third, only some (six out of 26 in the example) of the traces are employed as representative, thereby throwing away valuable data from the many non-used traces. Fourth, the amplitude and phase information that is developed for bandwidth determination uses only one transfer function. It is well-known that the signal falls below the noise level differently for different transfer functions; therefore, the use of more than one transform function is always better than the use of only one transfer function. Finally, there is no mention as to how Schimunek and Stroble employed their finding of the common bandwidth for subsequent signal processing operations.

In January 1986, a diagnostic procedure to determine a common bandwidth was presented by M. A. Hall in an Horizon Exploration Limited Company brochure entitle "Mixed Source Techniques in Land Acquisition". The author considered the problems of matching seismic survey traces resulting from the use of a Hydra-Pulse source and from the use of a vibrator source. The procedure consisted of the following steps.

First, data was selected from scattered common source and receiver positions along the survey where the two sources were used. Because of the two sources, this resulted in two datasets, one containing data produced from the vibrator source and the other containing data produced from the Hydra-Pulse source.

Second, the crosscorrelation function was produced for each vibrator trace and the corresponding Hydra-Pulse trace, thereby producing one crosscorrelation function for each pair of traces.

Third, the average of all the crosscorrelation functions was determined.

Fourth, the Fourier Transform of the averaged crosscorrelation function was computed.

Fifth, from the Fourier Transform of step four, the amplitude and phase spectra were formed.

Sixth, the amplitude spectrum was normalized to unity, the logarithm to the base 10 of the normalized amplitude spectrum was taken and the results were multiplied by 20. In this form, the amplitude spectrum was plotted as a function of the frequency. The phase spectrum was also plotted as a function of frequency.

Seventh, from the amplitude and phase plots, it was determinable, by visual inspection, the frequency range over which both the amplitude and phase were zero.

This frequency range was then selected as the common bandwidth of the vibrator and Hydra-Pulse data. (It is noted that if the normalized amplitude spectrum, instead of its logarithm, were plotted as a function of the frequency, the common frequency range would correspond to those values where the normalized amplitude spectrum is unity.)

In addition to being primarily for the treatment of data produced at the same place and received at the same place for the two datasets, the Hall procedure performs a correlation analysis of the data and determines the common bandwidth from the amplitude and phase characteristics of the averaged crosscorrelation function. This approach is fundamentally different from one using one or more transfer functions to obtain a common bandwidth.

Therefore, it is a feature of this invention to provide an improved procedure for matching two datasets of seismic traces having different amplitude and phase characteristics by establishing therefor a common bandwidth, such procedure more accurately determining weighting factors and operating functions than in the prior art for maximizing available useful data while minimizing the effects of spurious data.

It is another feature of this invention to provide an improved procedure for matching two datasets of seismic traces having different amplitude and phase characteristics by establishing therefor a common bandwidth, such procedure utilizing least-squares filter design and a transfer function for each dataset, each transfer function being based on a weighted average using all of the filter designs.

SUMMARY OF THE INVENTION

The invention herein pertains to a method of establishing a common bandwidth for processing first and second seismic datasets having different amplitude and phase characteristics, such as would result in the development of seismic data by using two different kinds of sources (e.g., dynamite and vibrator sources). For each corresponding pair in the respective datasets a first mathematical filter is designed using the least-squares procedure and assuming therefor that the first dataset is the input and the second dataset is the desired output. A first transfer function from a weighted average of all of the first filters is determined. Then, for each corresponding pair in the respective datasets, a second mathematical filter is designed using the least-squares procedure and assuming therefor that the second dataset is the input and the first dataset is the desired output. A second transfer function from a weighted average of all of the second filters is determined. Then, first and second amplitude spectra are plotted from the respective first and second transfer functions and first and second phase spectra are plotted from the respective first and second transfer functions. Then, a single amplitude spectrum versus frequency is developed from the product of the two previous amplitude spectra and a single phase spectrum versus frequency is developed from the sum of the two previous phase spectra. Finally, the common bandwidth for subsequent use in processing the data is chosen that most nearly satisfies unity on the amplitude spectrum and zero on the phase spectrum.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the exemplary preferred embodiments thereof which are illustrated in the drawings, which form a part of this specification. It is to be noted, however, that the appended drawings illustrate only typical preferred embodiments of the invention and are not to be considered limiting of its scope as the invention may admit to other equally effective embodiments.

IN THE DRAWINGS

Figure 1:
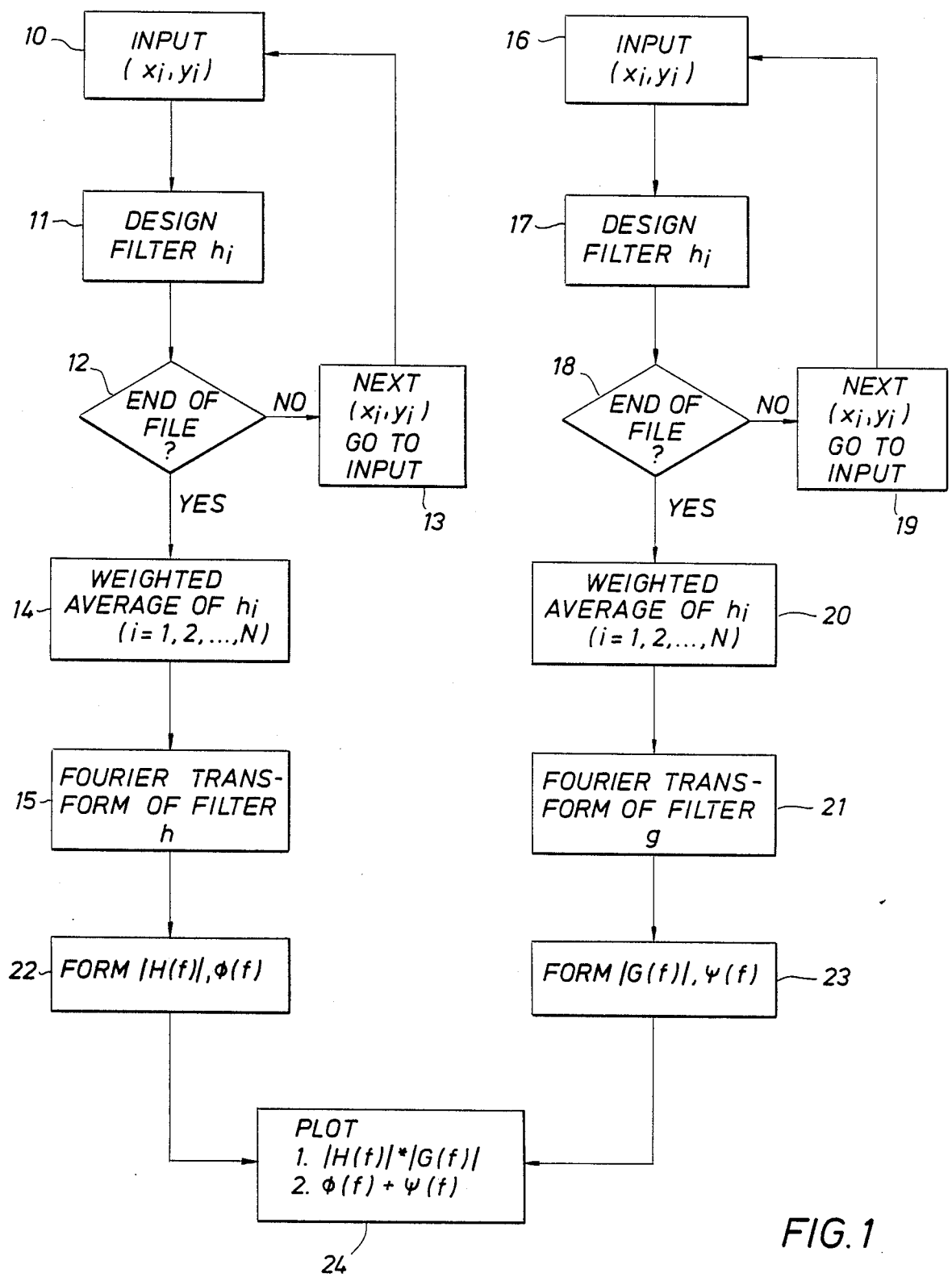

FIG. 1 is a flow chart illustrating the steps of the method in accordance with a preferred embodiment of the present invention.

Figure 2:
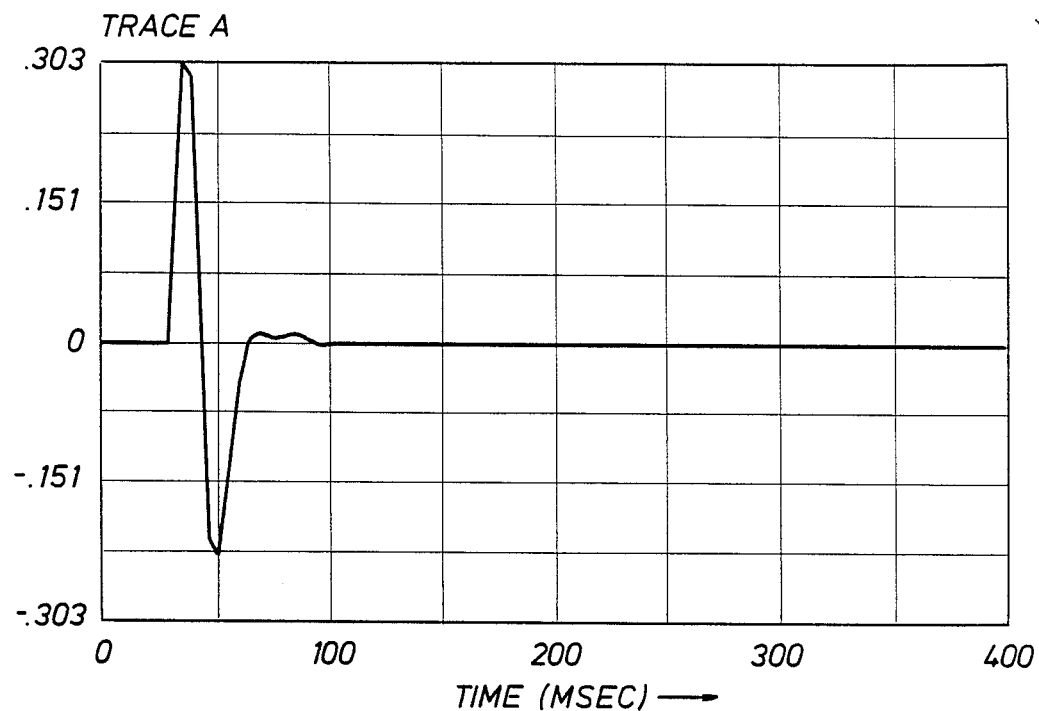
Figure 2:
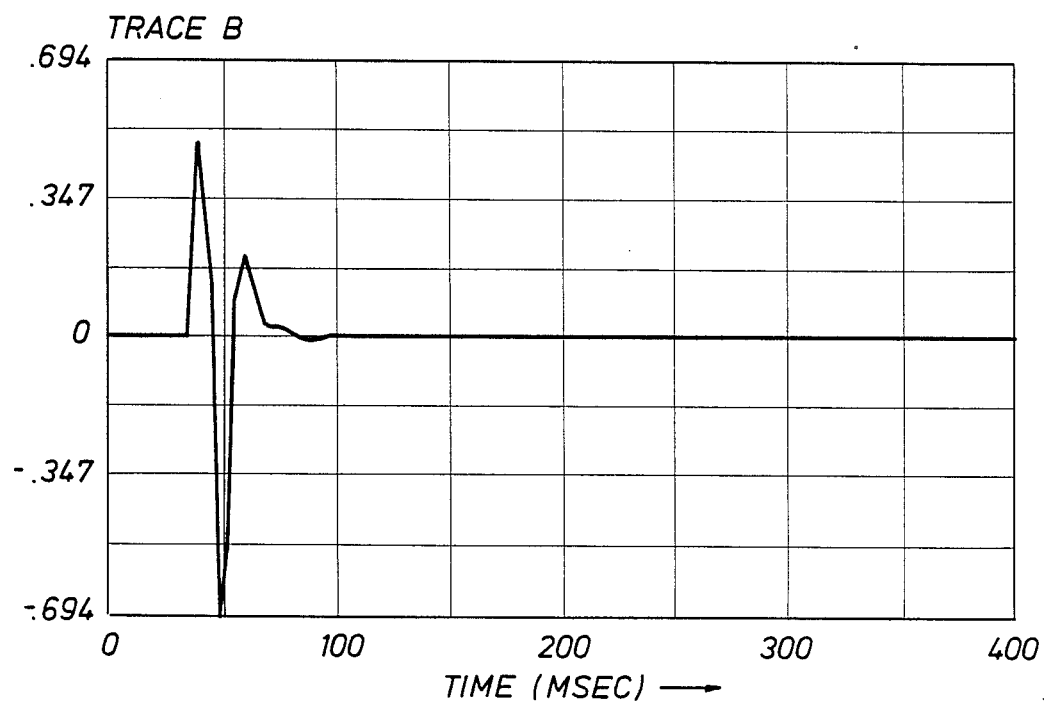

FIG. 2 is a plotting of two corresponding synthetic traces as a function of time.

Figure 3:
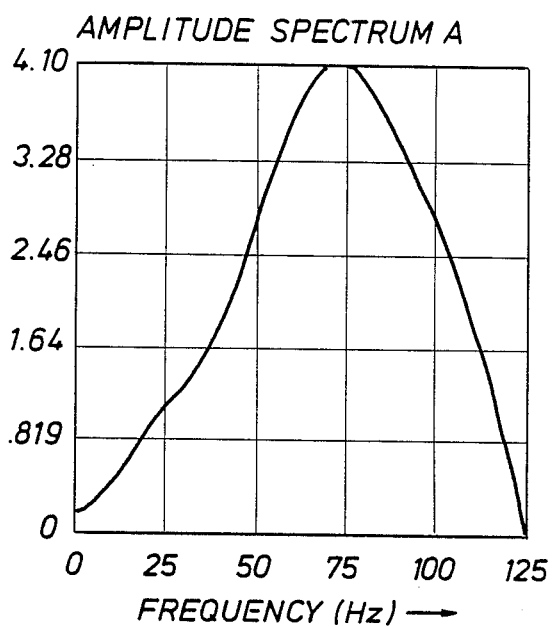

FIG. 3 is an amplitude spectrum of a transfer function to match trace A of FIG. 2 with trace B of FIG. 2.

Figure 4:
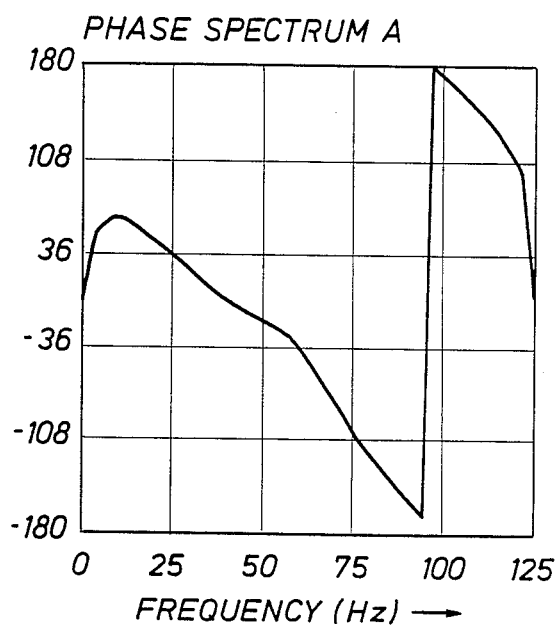

FIG. 4 is a phase spectrum of a transfer function to match trace A of FIG. 2 with trace B of FIG. 2.

Figure 5:
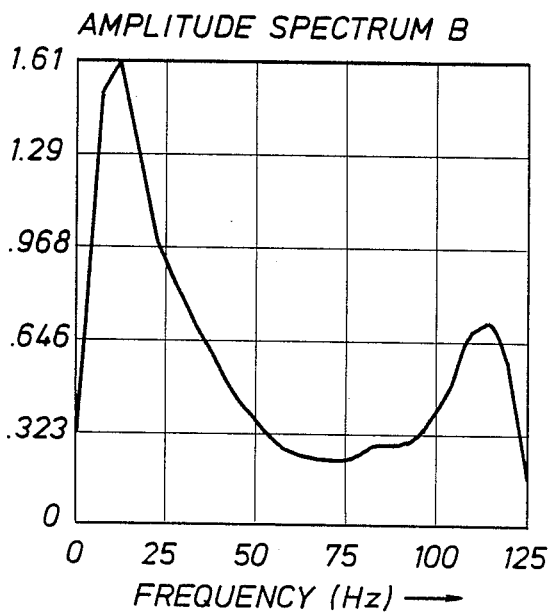

FIG. 5 is an amplitude spectrum of a transfer function to match trace B of FIG. 2 with trace A of FIG. 2.

Figure 6:
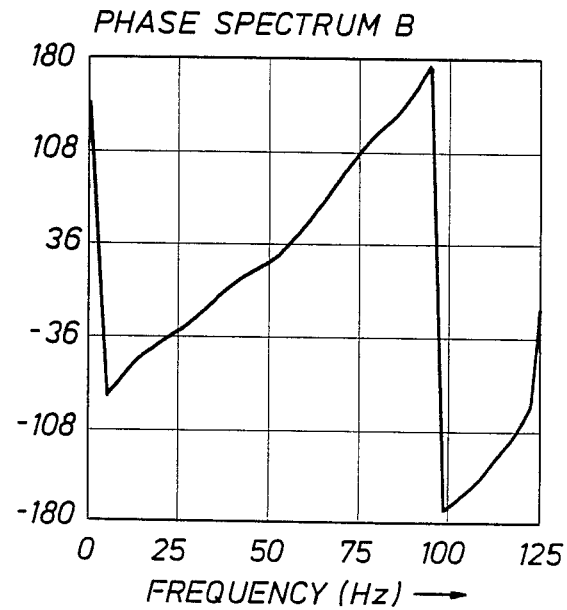

FIG. 6 is a phase spectrum of a transfer function to match trace B of FIG. 2 with trace A of FIG. 2.

Figure 7:
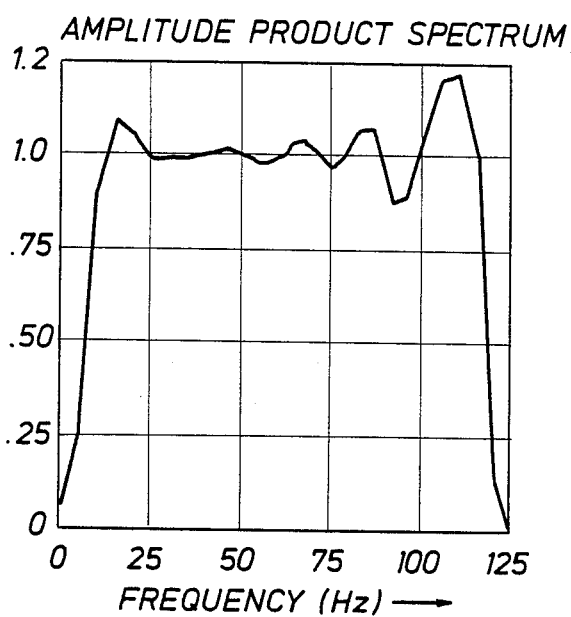

FIG. 7 is a plotting of the product of the amplitude spectra shown in FIGS. 3 and 5 versus frequency.

Figure 8:
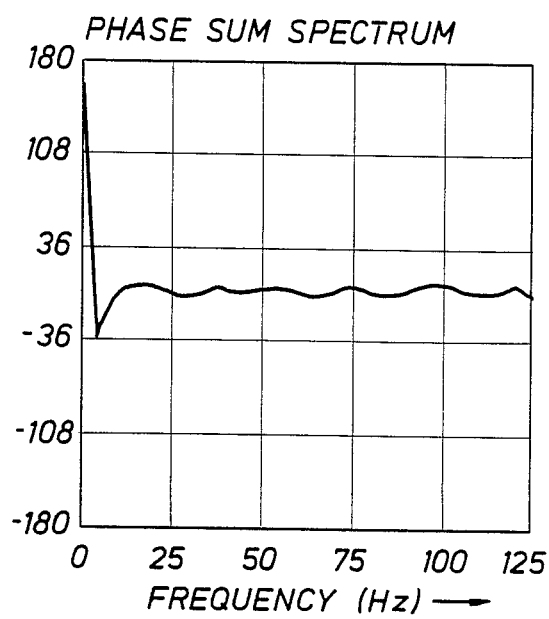

FIG. 8 is a plotting of the sum of the phase spectra shown in FIGS. 4 and 6 versus frequency.

Figure 9:
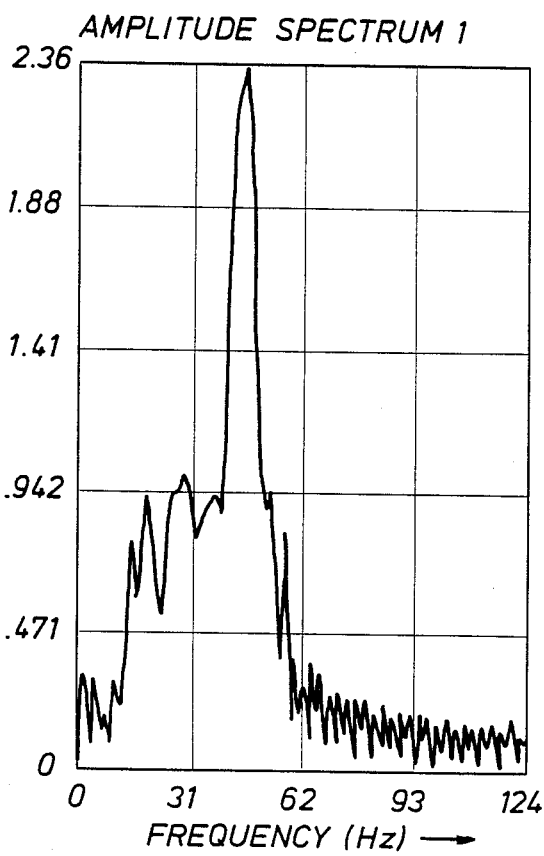

FIG. 9 is an amplitude spectrum of a transfer function to match traces from typical survey 1 with traces from typical survey 2.

Figure 10:
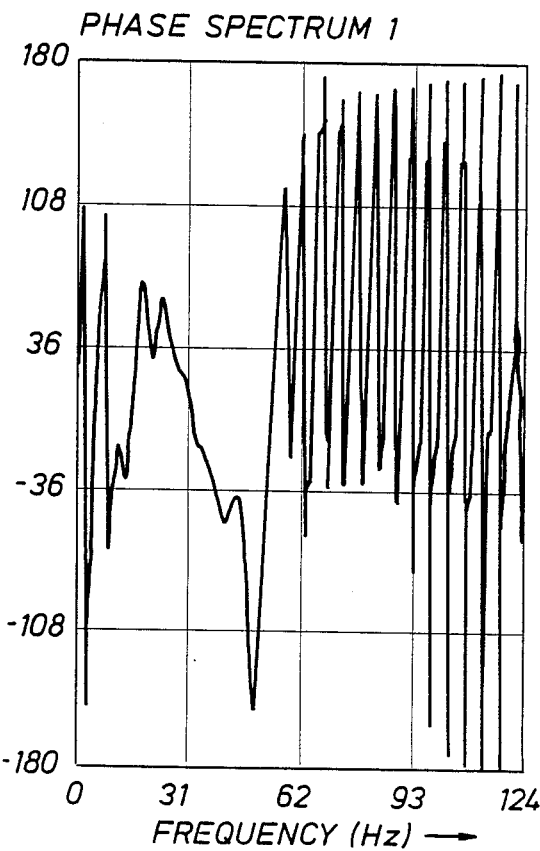

FIG. 10 is a phase spectrum of a transfer function to match traces from typical survey 1 with traces from typical survey 2.

Figure 11:
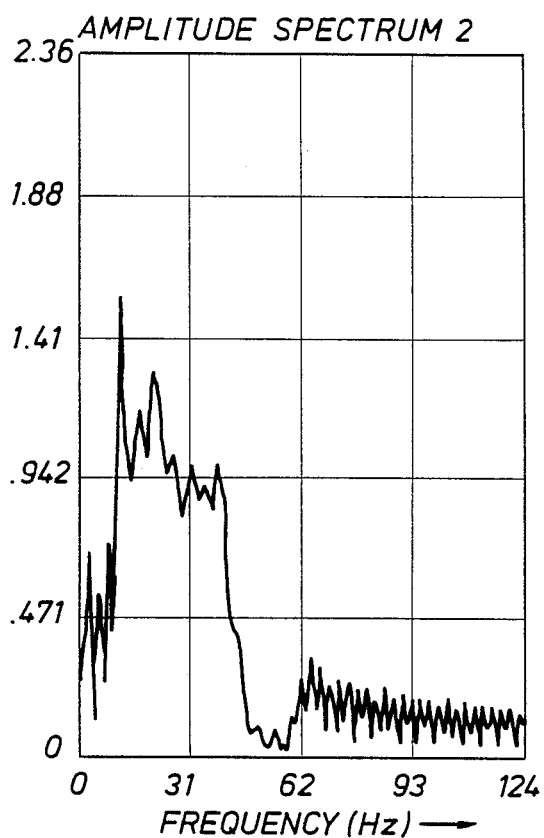

FIG. 11 is an amplitude spectrum of a transfer function to match traces from typical survey 2 with traces from typical survey 1.

Figure 12:
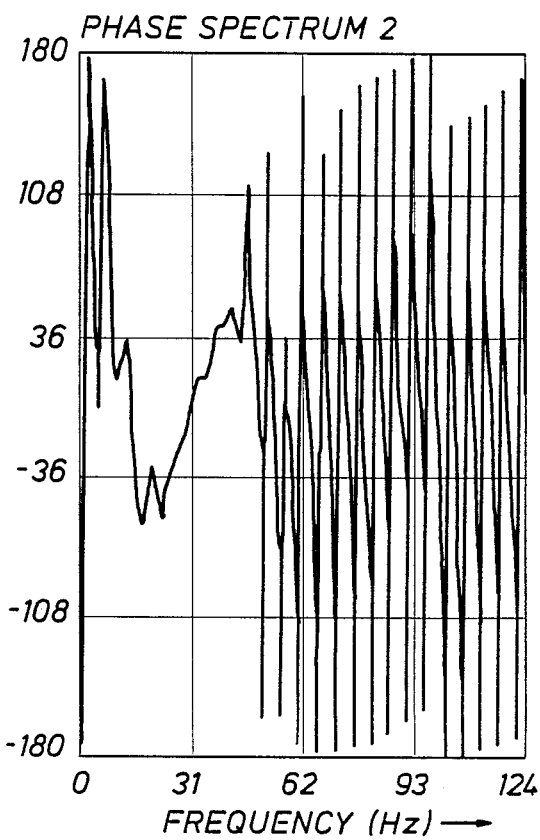

FIG. 12 is a phase spectrum of a transfer function to match traces from typical survey 2 with traces from typical survey 1.

Figure 13:
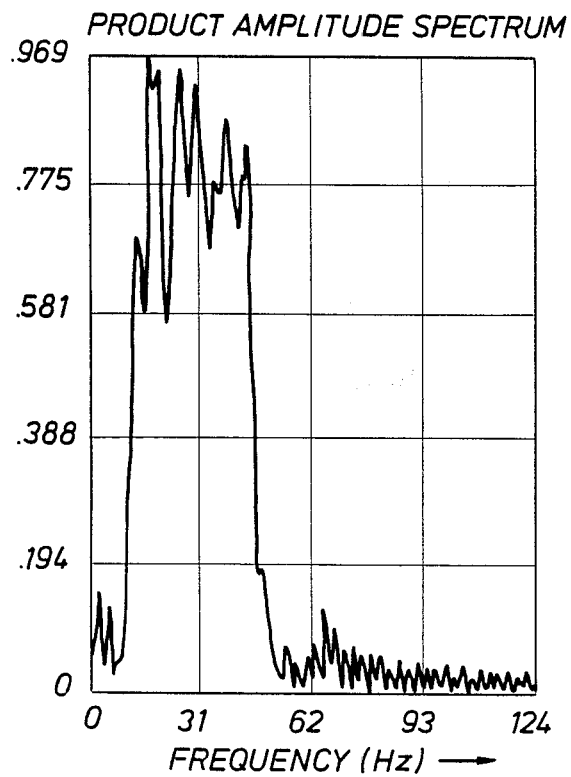

FIG. 13 is a plotting of the product of the amplitude spectra shown in FIGS. 9 and 11 versus frequency.

Figure 14:
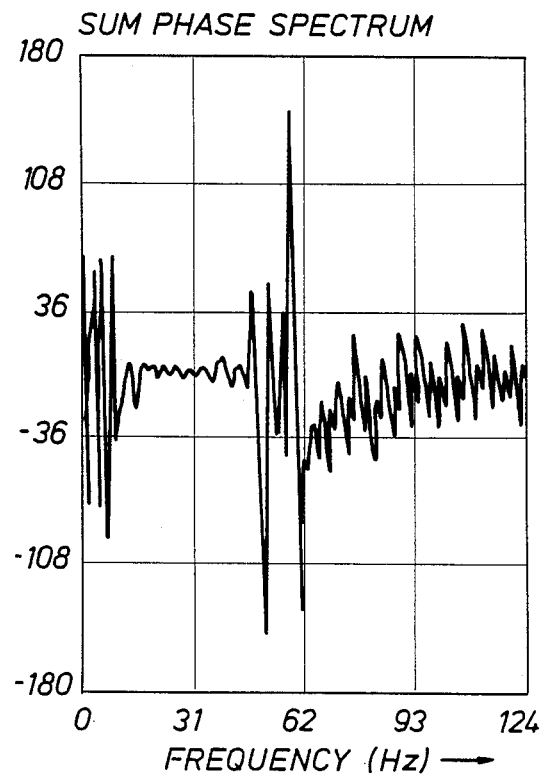

FIG. 14 is a plotting of the sum of the phase spectra shown in FIGS. 10 and 12 versus frequency.

DESCRIPTION OF THE PREFERRED EMBODIMENTS

The method for establishing a common bandwidth in accordance with the invention comprises a sequence of steps involving mathematical calculations and manipulations performed on datasets. These calculations and manipulations are most conveniently and practically performed using a digital computer. In seismic data processing, a "dataset" is the term used to define a set of digitized seismic traces, such traces having been recorded in a seismic field survey. Because seismic data is usually processed on a digital computer, such as manufactured by Cray, IBM or the like, the dataset generally resides in a computer storage device, such as a magnetic tape, a magnetic disk or the like. However, it will be apparent that the implementation of this invention is independent of the type of computer hardware, the medium of data storage and retrieval and the type of programming language, such as FORTRAN or the like.

For purposes of discussing the procedure in terms of mathematical calculations herein, the two datasets are identified as A and B, each consisting of N digitized seismic traces. Further, let the traces from dataset A be indexed as $x_1, x_2, \ldots, x_N$ and those from dataset B be indexed as $y_1, y_2, \ldots, y_N$. The inventive method for establishing the common bandwidth for datasets A and B, which is also graphically summarized in the flow chart shown in FIG. 1, proceeds, as follows:

First, for the first pair of traces, $x_1$ and $y_1$ as the respective input and desired output, a filter, $h_1$, is computed using the least-squares method, thereby matching trace $x_1$ to trace $y_1$. This is shown in FIG. 1 at blocks 10 and 11. Digital filter design employing the least-squares method is well-known in the art and is described, for example, by E. A. Robinson and S. Treitel at Chapter 6, "Principles of Least-Squares Filtering" in *Geophysical Signal Analysis*, copyright 1980 by Prentice-Hall, Englewood Cliffs, New Jersey, which description is incorporated herein for all purposes. Generally, a least-squares digital filter is a filter that is designed by way of the least-squares method to minimize the mean squared error between the filtered input and the desired output. The Levinson recursion algorithm described in the Robinson and Treitel reference is an efficient numerical algorithm for calculating this type of filter.

In like fashion, for the second pair of traces, $x_2$ and $y_2$, the least-squares filter, $h_2$, is computed to match trace $x_2$ to trace $y_2$. The procedure is continued, as shown in blocks 12 and 13, until all of the remaining pairs of traces, $x_i, y_i$ (wherein, $i=3, i=4, \ldots, N$) have been processed, yielding least-squares filters $h_1, h_2, h_3, h_4, \ldots, h_N$.

Next, as shown in block 14, the weighted average, h, of filters $h_1, h_2, \ldots, h_N$ are computed using as weights $w_i = 1-e_i$, wherein, $i=1, 2, \ldots, N$ and $e_i$ is the error in the i-th least-squares filter design for $h_i$. The error $e_i$ is determined from the expression $$e_i = 1 - (h_i(\phi)*C_i(100) + h_i(1)*C_i(1) + \ldots + h_i(m)*C_i(m))/A_i \text{ where}$$

$$A_i = y_i(\phi)*y_i(\phi) + y_i(1)*y_i(1) + \ldots + y_i(L)*y_i(L).$$

and $C_i$ is the crosscorrelation of $y_i$ and $x_i$. In the above expressions $m+1$ is the number of filter coefficients in the filter $h_i$ and $L+1$ is the number of data samples in traces $y_i$ and $x_i$. Thus, $h_i(\phi), h_i(1)$, etc. denote the first and second coefficients of the filter $h_i$. $y_i(\phi), y_i(1)$, etc. denote the first and second data samples of the trace $y_i$. $C_i(\phi), C_i(1)$, etc. denote the first and second crosscorrelation coefficients. These expressions are discussed in Chapter 6 of Geophysical Signal Analysis by Robinson and Treitel referred to above.

The expression for h becomes the following:

$$h = (w_1*h_1 + w_2*h_2 + \ldots + w_N*h_N)/(w_1 + \ldots + w_N),$$

wherein * denotes the symbol for multiplication.

It may be seen from an analysis of the above formula, that given a set of filters, h, and a set of weights, $w_i$, the weighted average of $h_i$ is defined as the sum of each of the set of numbers in $h_i$ multiplied by the corresponding $w_i$ normalized to the sum of $w_i$.

From computed weighted average h, discrete Fourier Transform, H(f), of h is computed as shown in block 15, thereby becoming the transfer function for matching traces from dataset A to those of dataset B. This transfer function describes the frequency domain characteristics, i.e., the amplitude and phase, of digital filter h. The transfer function describes the frequency domain characteristics, namely, amplitude and phase, of a filter. For a digital filter, the transfer function is found by evaluating the discrete Fourier Transform (DFT) of the digital filter. The fast Fourier Transform (FFT) algorithm is an efficient numerical algorithm for evaluating the DFT.

Now, as shown in blocks 16 through 21 in FIG. 1, the previous steps are repeated with the roles of $x_i$ and $y_i$ being reversed. That is, to proceed from block 16 to block 17, it is assumed that for the first pair of traces, $y_1$ and $x_1$, $y_1$ is the input and $x_1$ is the desired output. The same order is followed with each subsequent pair of traces. Then, by following the block 10-15 type, procedure for blocks 16-21, there is obtained a least-squares filter, $g_1$, to match trace $y_1$ to trace $x_1$, and subsequent least-squares filters $g_2, g_3, \ldots, g_N$, as shown at block 17. Then, the weighted average, g, is developed from filters $g_1, g_2, \ldots, g_N$ using as weights $W_i = 1 - E_i$, wherein, $i=1, 2, \ldots, N$ and $E_i$ is the error in the i-th least-squares filter design for $g_i$. The expression for $E_i$ is given by an expression similar to that of $e_i$ except that $g_i$ is used in place of $h_i$ and the roles of $x_i$ and $y_i$ are reversed. The expression for g becomes the following:

$$g = (W_1*g_1 + W_2*g_2 + \ldots + W_N*g_N)/(W_1 + \ldots + W_N),$$

wherein * denotes the symbol for multiplication. This result is illustrated at block 20 of the diagram.

From computed weighted average g, discrete Fourier Transform, G(f), of g is computed, as shown in Block 21. This becomes the transfer function for matching traces from dataset B to those of dataset A. This transfer function describes the frequency domain characteristics, namely, amplitude and phase, of digital filter g.

Next, the respective amplitude and phase spectra from each of the Fourier Transforms is developed. That is, from H(f), amplitude spectra, $|H(f)|$, is developed as follows:

$$|H(f)| = [(Re[H(f)])^2 + (Im[H(f)])^2]^{\frac{1}{2}}$$

Also, from H(f), phase spectra, $\phi(f)$, is developed, as follows:

$$\phi(f) = \arctan(Im[H(f)]/Re[H(f)]),$$

wherein, Re denotes the real part of the transform of H(f), Im denotes the imaginary part of the transform of H(f), and arctan denotes the inverse tangent function.

In like fashion, the amplitude, $|G(f)|$, and phase, $\psi(f)$, spectra are developed from Fourier Transform, G(f), as follows:

$$|G(f)| = [(Re[G(f)])^2 + (Im[G(f)])^2]^{\frac{1}{2}}, \text{ and}$$

$$\psi(f) = \arctan(Im[G(f)]/Re[G(f)]).$$

The development of $|H(f)|$ and $\phi(f)$ are shown in block 22 and the development of $|G(f)|$ and $\psi(f)$ are As represented by block 24, the graphs of the amplitude product, namely, $|H(f)| * |G(f)|$, and the phase sum, namely, $\phi(f) + \psi(f)$ as a function of frequency f are then plotted. From the amplitude product plot and the phase sum plot, it is possible to determine by visual inspection, the frequency range of f between $f_1$ and $f_2$ over which the equations below are satisfied:

$$|H(f)| * |G(f)| = 1, \text{ and}$$

$$\phi(f)+\psi(f)=0.$$

The frequency range between $f_1$ and $f_2$ is the common bandwidth over which datasets A or B can be matched.

Now referring to FIG. 2, two synthetic signals are illustrated with the top figure being a plot of a trace A as a function of time and the bottom figure being a plot of a trace B as a function of time. It may be observed that trace B appears larger in magnitude and has a different shape than trace A. The difference in shape is due to the differences in frequency bandwidth and phase that occur in real datasets when different types of sources are used in generating the two traces. Unlike actual seismic recordings, however, no noise is superimposed on the signals in these synthetic representations.

Using the procedures previously described, FIG. 3 is the amplitude spectrum of the transfer function to match trace A with trace B and FIG. 4 is the phase spectrum of the transfer function to match trace A with trace B. In like manner, FIG. 5 is the amplitude spectrum of the transfer function to match trace B with trace A and FIG. 6 is the phase spectrum of the transfer function to match trace B with trace A. When the product of the amplitude graphs of FIGS. 3 and 5 are plotted, the amplitude product spectrum graph shown in FIG. 7 is developed. Similarly, when the sum of the phase graphs of FIG. 2 and 4 are plotted, the phase sum spectrum graph shown in FIG. 8 is developed. From FIGS. 7 and 8 it may be seen that the amplitude product spectrum is approximately 1.0 over a frequency range of 20 to 48 hertz. The phase sum spectrum is approximately zero over a longer frequency range than that, but including the range of 20 to 48 hertz. Hence, both of the final equations of the calculations are satisfied over the frequency range 20 to 48 hertz, namely $$|H(f)^*|G(f)|=1, \text{ and}$$

$$\phi(f)+\psi(f)=0.$$

Referring to actual recorded seismic data as such data is developed from a line tie situation involving data from two different seismic surveys. These two surveys can be referred to, for convenience, as survey 1 and survey 2. A total of five pairs of traces in the vicinity of the crossline point were used from these surveys in the least-squares calculation of the filters to produce the graphs in FIGS. 9–12. FIG. 9 is the amplitude spectrum of the transfer function to match survey 1 with survey 2 and FIG. 10 is the phase spectrum of the transfer function to match survey 1 with survey 2. In similar fashion, FIG. 11 is the amplitude spectrum of the transfer function to match survey 2 with survey 1 and FIG. 12 is the phase spectrum of the transfer function to match survey 2 with survey 1. From the two amplitude spectrum graphs, namely, FIGS. 9 and 11, the produce amplitude spectrum of FIG. 13 is developed and from the two phase spectrum graphs, namely, FIGS. 10 and 12, the sum phase spectrum of FIG. 14 is developed.

It will be seen from a close study of these FIGS. 13 and 14 that the two final equations are both approximately satisfied over the frequency range of from 12 to 45 hertz. Thus, this is the common bandwidth of survey 1 and survey 2. It should be noted that due to the presence of an additive noise component in the data, the phase sum will fluctuate about zero outside the common signal band. Likewise, the amplitude product will drop to zero outside this bandwidth.

While several embodiments have been described and illustrated it will be understood that the invention is not limited thereto, since many modifications may be made and will become apparent to those skilled in the art.

What is claimed is:

1. Method of establishing a common bandwidth for processing first and second seismic datasets obtained having different amplitude and phase characteristics, which comprises for each corresponding pair of the respective datasets, determining a first least-squares filter by assuming the data from the first dataset is the input and the data from the second dataset is the desired output, determining a first transfer function from a weighted average of all of said first filters, for each corresponding pair of the respective datasets, determining a second least-squares filter by assuming the data from the second dataset is the input and the data from the first dataset is the desired output, determining a second transfer function from a weighted average of all of said second filters, creating respective first and second amplitude spectra from said first and second transfer functions, creating respective first and second phase spectra from said first and second transfer functions, plotting the product of said first and second amplitude spectra versus frequency, plotting the sum of said first and second phase spectra versus frequency, and graphically determining the common bandwidth that most nearly satisfies both the amplitude product plot and the phase sum plot.

2. The method of establishing a common bandwidth in accordance with claim 1, wherein the first and second least-squares filters are determined using the Levinson recursion algorithm.

3. The method of establishing a common bandwidth in accordance with claim 1, wherein the weighted average of all of said first filters are computed using as weights $w_i=1-e_i$, wherein $i=1, 2, \ldots, N$, N is the number of said first filters; and $e_i$ is the error in the i-th least-square filter design for said first least-squares filter and the weighted average of all of said second filters are computed using as weights $W_i=1-E_i$, wherein $i=1, 2, \ldots, N$, N is the number of said second filters, and $E_i$ is the error in the i-th least-squares filter design for said second least-squares filter.

4. The method of establishing a common bandwidth in accordance with claim 1, wherein said first transfer function is the discrete Fourier Transform computed from said weighted average of all of said first filters and said second transfer function is the discrete Fourier Transform computed from said weighted average of all of said second filters.

5. The method of establishing a common bandwidth in accordance with claim 4, wherein the fast Fourier Transform algorithm is employed for evaluating each of said discrete Fourier Transforms of said respective first and second transfer functions.

6. The method of establishing a common bandwidth in accordance with claim 1, wherein said amplitude product plot equals one and said phase sum plot equals zero.

7. The method of establishing a common bandwidth in accordance with claim 6, wherein said amplitude product plot falls to zero outside of the common bandwidth.

* * * * *